Dec. 26, 1922.

M. E. FULD.
BATTERY CELL.
ORIGINAL FILED JUNE 23, 1919.

1,439,956.

INVENTOR
Manes E. Fuld,
By John W. Harley,
Attorney

Patented Dec. 26, 1922.

1,439,956

UNITED STATES PATENT OFFICE.

MANES E. FULD, OF BALTIMORE, MARYLAND.

BATTERY CELL.

Application filed June 23, 1919, Serial No. 306,101. Renewed June 22, 1922. Serial No. 570,184.

*To all whom it may concern:*

Be it known that I, MANES E. FULD, a citizen of the United States, residing at Baltimore, in the State of Maryland, have invented certain new and useful Improvements in Battery Cells; and I do hereby declare the following to be a full, clear, and exact description of the invention, such as will enable others skilled in the art to which it appertains to make and use the same.

My invention relates to battery cells.

One object of my invention is to provide an anode for a battery cell composed of any suitable material, made cup shaped or cylindrical in form and closed at one end without seam or joint by a process hereinafter explained. Heretofore, cup shaped anodes have been formed by casting, or by using sheet metal which is afterwards rolled into cylindrical form and having the abutting edges either soldered or crimped together, the bottom afterwards being crimped or soldered in place. The cast cup shaped anode was difficult to form because the material was necessarily thin in order to avoid excessive cost; and furthermore, different rates of cooling of the different portions of said anode were likely to produce differences in the crystallization of the metal thereof and considerable local action resulted. With the cup shaped anode formed of sheet metal having a soldered or crimped joint in the cylindrical surface thereof and a soldered or crimped joint where the bottom was attached to the cylindrical portion, the local action due to differences of crystallization of the metal was in a large measure avoided, but a new cause of local action arose which was due to the differences in the characteristics of the metal forming the body of the cup and those portions forming the seams. By the use of my improved anode, local action due to these causes is entirely avoided and furthermore, the metal, during the formation of my improved cup-shaped anode, is subjected to compressive stresses which make said metal extremely homogeneous in character.

A further object of my invention is to provide a cathode for a battery cell comprising a conducting wire having depolarizing material in electric connection therewith, and a wrapping of fibrous material bound around said depolarizing material by a conducting filament in such manner as to retain the wrapping in close contact with the depolarizing material, without establishing a path of lower resistance between said filament and the anode of the battery with which my improved cathode is used, than the paths between the other portions of my improved cathode and said anode.

A further object of my invention is to provide for effectively insulating the upper side of the bottom of my improved anode so that the cathode will be insulated from said anode, and also, that any deposits of crystals from the electrolyte or portions of finely divided metal from the anode or cathode will not create a path of low resistance between said anode and cathode.

A further object of my invention is to provide for effectively sealing the top of my improved anode while at the same time allowing of a slight degree of compression in said seal, to provide for variations in the volume of the electrolyte, owing to the ordinary variations of temperature thereof, and also, for the expansion of said electrolyte, due to freezing.

In carrying out my invention I make use of the instrumentalities illustrated in the accompanying drawings, in which:—

10 represents my improved anode.

Figure 1:
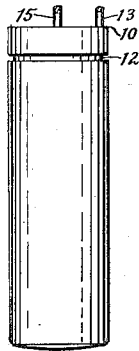
Fig. 1 is an elevation of my improved battery cell.
Figure 3:
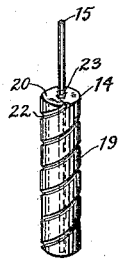
Fig. 3 is a perspective view of my improved cathode.
Figure 2:
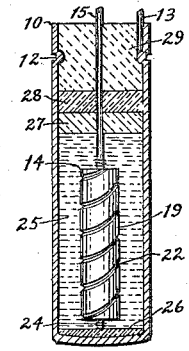
Fig. 2 is a sectional view of the cell shown in Fig. 1, the anode, insulation at the bottom thereof, and the seal being shown in central section, and the cathode being shown in elevation.
Figure 5:
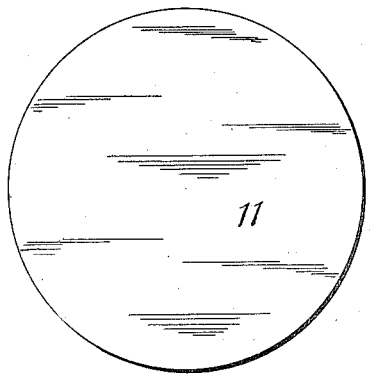
Fig. 5 is a view of the blank from which my improved anode is formed.
Figure 6:
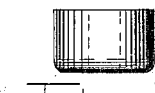
Figs. 6, 7 and 8 are reduced views of the various shapes into which my improved anode is formed during its transition from the shape shown in Fig. 5 to that shown in Figs. 1 and 2.
Figure 7:
Figure 8:

In making my improved anode, I first form the metal in the shape of a flat disc 11, as shown in Fig. 5. The metal may be of any element or combination of elements suitable for use as an anode. After the disc 11 is formed of the proper diameter and of a suitable thickness, as shown in Fig. 5, by the operation of suitable drawing dies, it is drawn successively into the shapes shown in Figs. 6, 7 and 8, and afterwards, into the shape shown in Figs. 1 and 2 without the crimp 12. The crimp 12 is afterwards put in by rolling or in any suitable manner. There may be more or fewer steps between the disc 11 and the anode 10 than those illustrated in Figs. 6, 7 and 8, the requisite steps being determined by the size and shape of the anode and the material of which it is composed. My preferred anode is formed of zinc and I find that the steps in its production, just explained, are suitable for that metal.

It is evident that the disc 11 being cut from a rolled sheet of metal is much more dense than cast material could possibly be and that by my additional operations in changing the form of said disc to the form of the anode 10, a considerable increase in the density and homogeneity of the metal is produced. The anodic conductor 13 is secured to the anode 10 in the position shown in Fig. 2.

My improved cathode 14 comprises a cathodic conductor 15 which, in my preferred form of battery, is composed of silver. A cylinder 16 composed of chloride of silver, which serves as a depolarizer, is cast around the lower portion of the cathodic conductor 15. The cylinder 16 does not extend to the lower end of the cathodic conductor 15, but a small portion 17 of said conductor extends below said cylinder for a purpose hereinafter explained. The cylinder 16 is provided with a spiral groove 18 cast or otherwise formed in the cylindrical surface thereof.

The wrapping 19 is placed over the cylinder 16 and the ends of said wrapping are folded over the ends of said cylinder as at 20 and 21. The filament 22, which in my preferred form of cathode is a fine silver wire, has one end wound around the conductor 15 adjacent to the upper end of the cylinder 16, as at 23, and said filament is then wound around the wrapping 19 and presses said wrapping into the groove 18; the other end of the filament 22 is then wrapped around the portion 17 of the conductor 15, as at 24.

When the filament 22 is wound around the wrapping 19, it presses said wrapping into the groove 18 until the outer surface of said filament is at approximately the same, or a less, distance from the axis of the cylinder 16 than the distance of the cylindrical surface of said wrapping from said axis.

Where the ends of the filament are carried across the wrapping at the ends of the cylinder, as at 20 and 21, and wound around the conductor 15, as at 23 and 24, said ends of the filament serve to secure the folded over ends of the wrapping 19.

The electrolyte 25 may be of any approved composition, one suitable composition being an aqueous solution of zinc chloride.

In order to prevent contact between the lower end of the conductor 15 and the inside surface of the bottom of the anode 10, I introduce a small quantity of a solution of insulating materials into the anode 10. Said solution is of materials that will dry rapidly and form a hard deposit 26 in the bottom of said anode.

After the cathode 14 and the electrolyte 25 are introduced within the anode 10, a solution of insulating materials is poured in on top of the electrolyte, said solution being the same as that used for making the deposit 26 and leaving a hard deposit 27. Over the hard deposit 27, I pour a solution of insulating materials, said solution being of such materials that it will dry rapidly and leaves a soft deposit 28 immediately on top of the hard deposit 27. Above the soft deposit 28, I pour in a mixture of plaster of Paris and water 29 which hardens and still further closes the upper end of the anode 10.

It is evident that the deposit 26 will insulate the bottom of the cathode 14 and the cathodic conductor 15 from the bottom of the anode 10.

The soft deposit 28 is provided in order to yield when the electrolyte 25 expands through the ordinary changes in temperature or through freezing.

The fibrous wrapping 19 serves to hold any particles that might break away from the chloride of silver cylinder 16 and also prevents the short circuiting of the battery which might otherwise take place by the formation of a bridge of metallic particles between the walls of the anode 10 and the outside of the chloride of silver cylinder 16.

Figure 4:
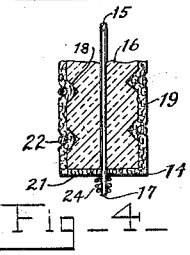
Fig. 4 is an enlarged partial longitudinal section of the bottom portion of my improved cathode.

The filament 22 serves to retain the wrapping 19 in place and said retention is greatly assisted by the fact that said filament presses said wrapping into the spiral groove 18. By reason of the fact that the filament 22 is pressed in to the fibrous wrapping 19, as shown in Fig. 4, there is practically no reduction of resistance between the walls of the anode 10 and the surface of the cylinder 16 adjacent to the filament 22, and consequently, there is no greater flow of current to said portions than to the other portions of said cylinder.

I have shown one embodiment of my improved battery cell, but it is evident that many changes may be made therein without departing from the spirit thereof.

I claim:—

In a battery cell, the combination with a cup shaped anode comprising a crimp near its open end, a cathode and an electrolyte in said anode, of a hard plastic insulator adhering to the bottom of said anode, a hard plastic sealing overlying said electrolyte and adhering to the walls of said anode, a soft plastic sealing overlying said hard plastic sealing and adhering to the walls of said anode, and a stopper cast in place over said soft plastic sealing and retained in place by said crimp.

In testimony whereof, I affix my signature.

MANES E. FULD.